UNITED STATES PATENT OFFICE.

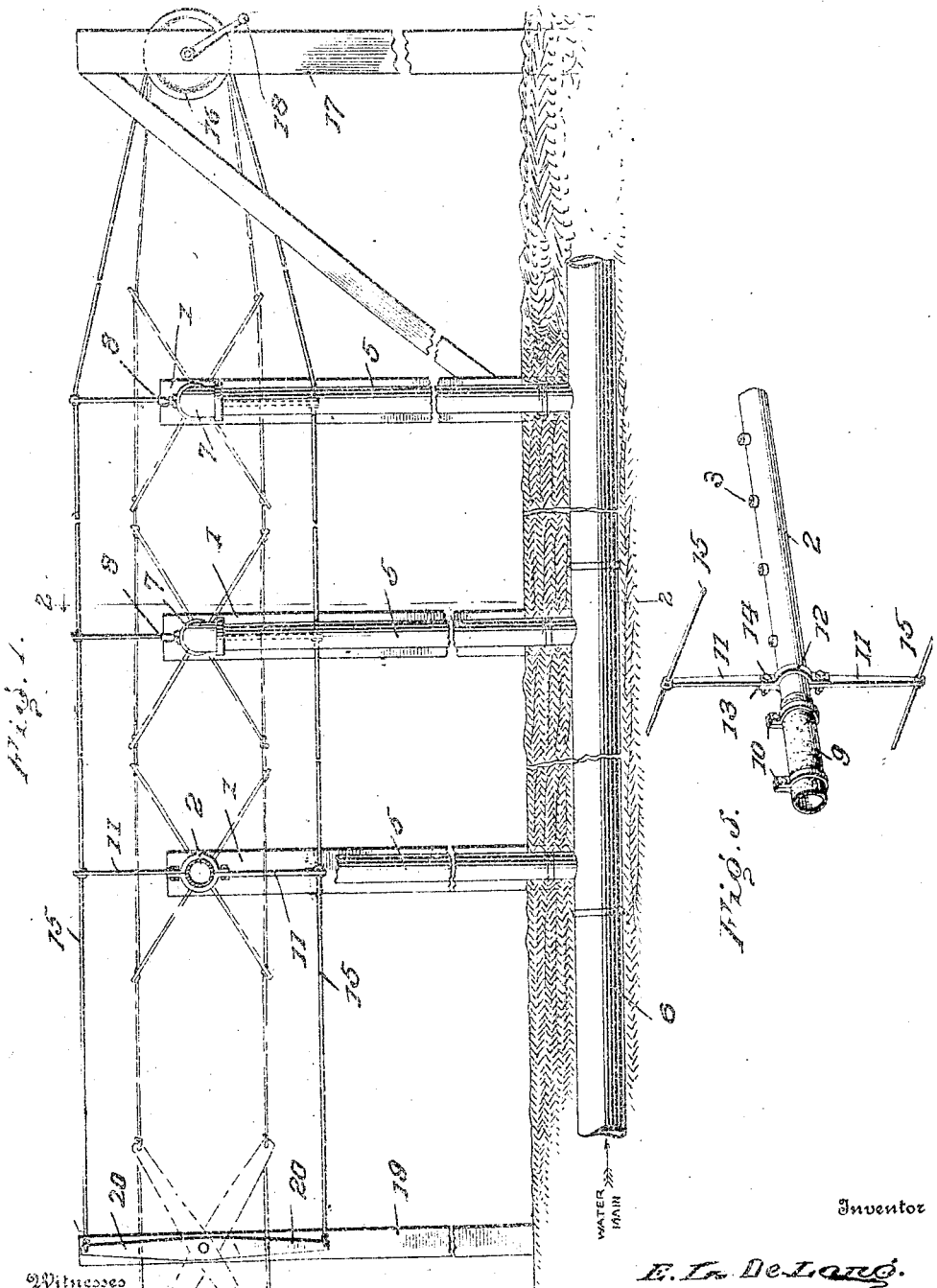

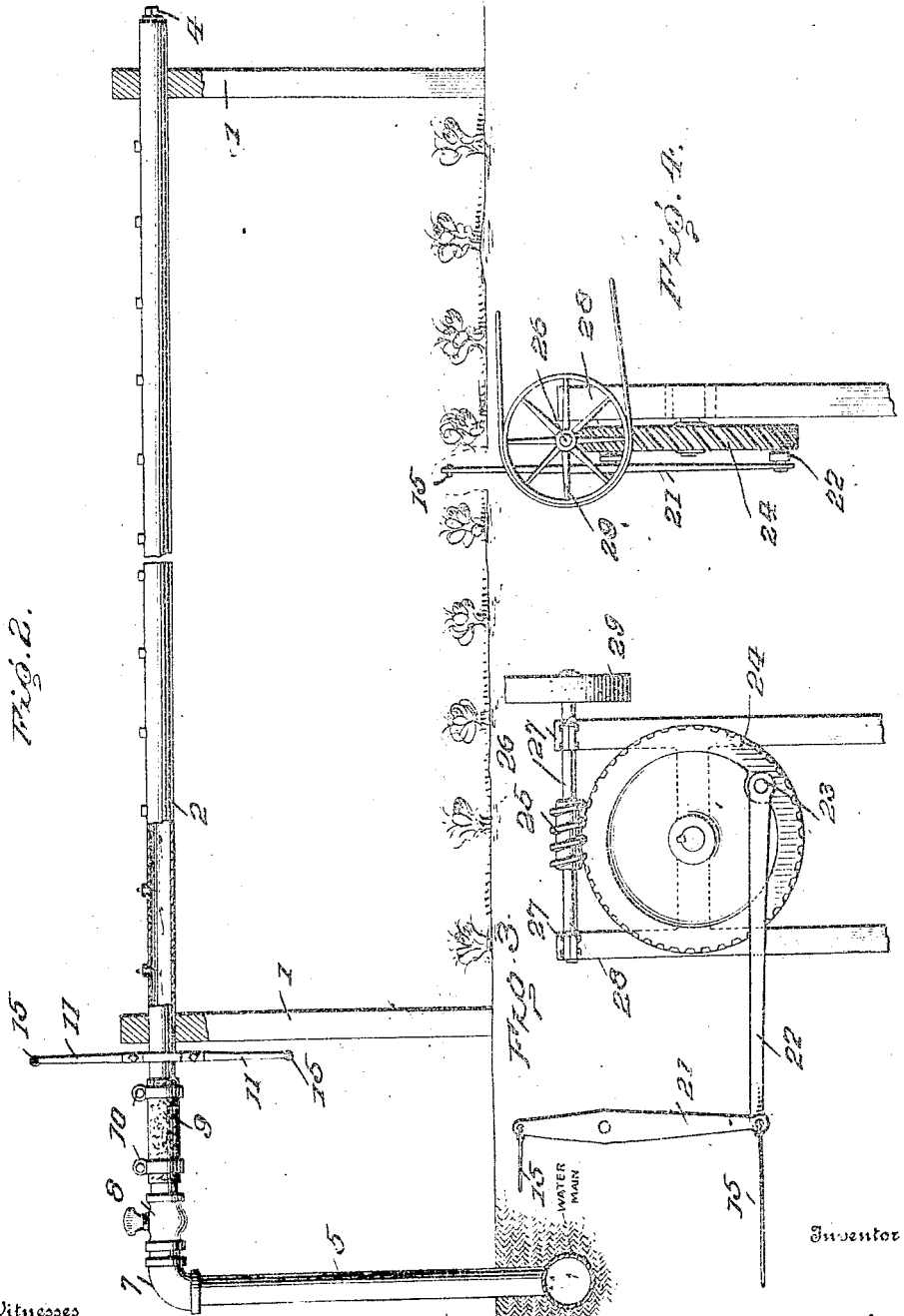

ERNEST L. DE LONG, OF CLEARWATER, FLORIDA.

IRRIGATING SYSTEM.

No. 915,162.  Specification of Letters Patent.  Patented March 16, 1909.

Application filed January 6, 1908. Serial No. 409,454.

*To all whom it may concern:*

Be it known that I, ERNEST L. DE LONG, a citizen of the United States, residing at Clearwater, in the county of Hillsboro and State of Florida, have invented certain new and useful Improvements in Irrigating Systems, of which the following is a specification.

My invention relates to certain new and useful improvements in irrigating systems, and the object of my invention is to provide an irrigating system of the type known as overhead irrigating, which shall be simple in construction, cheap to manufacture, composed of few parts and not liable to get out of order.

With these and other objects in view, my invention consists in certain constructions, combinations and arrangements of parts the preferred form of which will be first described in connection with the accompanying drawings and then the invention particularly pointed out in the claims.

Referring to the drawings wherein I show for the sake of illustration two forms of my invention and wherein the same part is designated by the same reference numeral wherever it occurs, Figure 1 is a broken side elevation of one form of my invention; Fig. 2 is a longitudinal view, partly in section, of one of the pipes; Fig. 3 is a detail side elevation of a modified form of operating mechanism; Fig. 4 is a view taken at right angles to Fig. 3; Fig. 5 is a perspective view of one end of a pipe with its operating arms and flexible connection.

1 designates a series of posts arranged in pairs situated at suitable distances apart on opposite sides of the field to be irrigated; 2 designates pipes rotatably mounted in the upper ends of the pairs of posts, the posts supporting the pipes at their ends as shown. These pipes are tapped at intervals along one side in which are inserted the nozzles 3, preferably of the character fully described and claimed in my application No. 382,499, filed July 6, 1907. At one end the pipes are closed by means of a cap 4 which is preferably screw-threaded thereon.

5, 5 designate upright pipes, one for each of the pipes 2, extending up from a main 6 which runs parallel with the posts on one side of the field. At the upper end each of the pipes 5 is provided with an elbow 7 to which is attached a stop-cock 8 of any ordinary construction.

9 is a section of rubber hose which connects the open end of the pipes 2 with the open end of the stop-cocks 8. This section of hose is clamped to the pipes 2 and the end of the stop cocks 8 by means of the clamps 10 of any ordinary or desired construction. By means of this rubber hose connection the pipes 2 may be given an oscillatory movement of the required amount, which is a little less than a half rotation, in order to direct the spray which issues from the nozzles to both sides of the pipe, whereby a large amount of territory can be covered by each of the pipes.

I may provide any desired means for oscillating the pipes and in the form of my invention shown such means consist of a pair of arms 11 which, at their inner ends, are provided with semi-circular collar portions 12 having the straight extensions 13 through which pass the screws 14, as best shown in Fig. 4, the screws 14 being adapted to enter tapped openings in the arms 11. By this construction the arms may be clamped on to pipes as shown. The arms are connected together by means of wires 15 which, in the form of construction shown in Figs. 1 and 2, extend around a drum 16 mounted in a post 17, the drum being provided with a handle 18 by means of which it may be turned.

19 is a post located at the end of the series opposite the post 17 on which is pivotally mounted the arm 20, to which the ends of the wire 15 are connected, thereby holding the wires taut.

In Figs. 5 and 6 I have shown a form of construction in which the oscillation of the pipes is effected by power. This means consists of a rock arm 21 mounted in the post 17 instead of the drum 16, to the ends of which are connected the wires 15. 22 is a pitman rod connected at one end to one end of the arm 21, and at its other end to a wrist pin 23 mounted on a worm gear 24, which engages a worm 25 mounted on a shaft 26, supported in bearings 27 of a suitable base 28.

29 is a belt pulley fast on the shaft 26 and adapted to be rotated from any suitable source of power. From this construction it will be seen that upon the rotation of the shaft 26 the worm 25 will rotate the worm gear 24, thus causing the arm 21 to oscillate about its central pivot 30.

The pipes 2 are preferably placed at such a height above the ground that a horse can readily pass thereunder, consequently the cultivation of the field provided with my irrigating system is not in the least interfered with.

In the operation of my device it will be understood that water under pressure is supplied to the main 6 from which it passes by the pipes 5 through the hose connections 9 and into the pipes 2 from which it passes out to the nozzles 3 in the form of fine streams.

The pipes are arranged across the field to be irrigated at such a distance apart that all the ground between the pipes will be covered during the oscillation of the pipes which, preferably, and as indicated by the dotted lines, is a little less than a half revolution. The pipes are slowly oscillated by either operating the drum 16 by hand or by the power mechanism shown in Figs. 5 and 6.

While I have shown but a small section of a complete irrigating plant, it is to be understood of course that in practice the pipes across the field may be of such length as to necessitate supporting them on posts arranged intermediate of the end posts shown, and the oscillating device may also be situated intermediate of the end post, as well as the water main, the exact construction depending of course upon the size and character of the particular field to be irrigated, and the simple construction showing the application of my invention to a small field is merely for the purpose of illustration.

While I have described what I believe to be the preferred form of my invention, I desire to have it understood that many changes may be made in the form, construction and arrangement of parts without departing from the spirit thereof.

What I claim as new and desire to secure by Letters Patent is—

1. In an irrigating system, the combination with a series of pipes extending parallel to each other and to the ground to be irrigated, said pipes being provided with openings along their length, means for supplying liquid for irrigating purposes to said pipes and means connecting said pipes, whereby they may be oscillated in unison.

2. In an irrigating system, the combination with a series of pipes extending parallel to each other and to the ground to be irrigated, said pipes being provided with openings along their length, arms secured to the pipes, wires connecting the arms, means for operating the wires to oscillate the pipes and means for supplying liquid for irrigating purposes to said pipes.

3. In an irrigating system, the combination with a series of pipes extending parallel to each other and to the ground to be irrigated, said pipes being provided with a series of openings along their length, a second series of pipes, one for each of the first mentioned series, sections of hose flexibly connecting the pipes of the two series together and means for oscillating all the pipes of the first mentioned series in unison.

In testimony whereof I affix my signature in presence of two witnesses.

ERNEST L. DE LONG.

Witnesses:
WILLIE LEE JOSEPH,
J. W. WILLIAMSON.